S. H. MOORE.
HOD STAND.
APPLICATION FILED APR. 1, 1911.
1,000,284.
Patented Aug. 8, 1911.
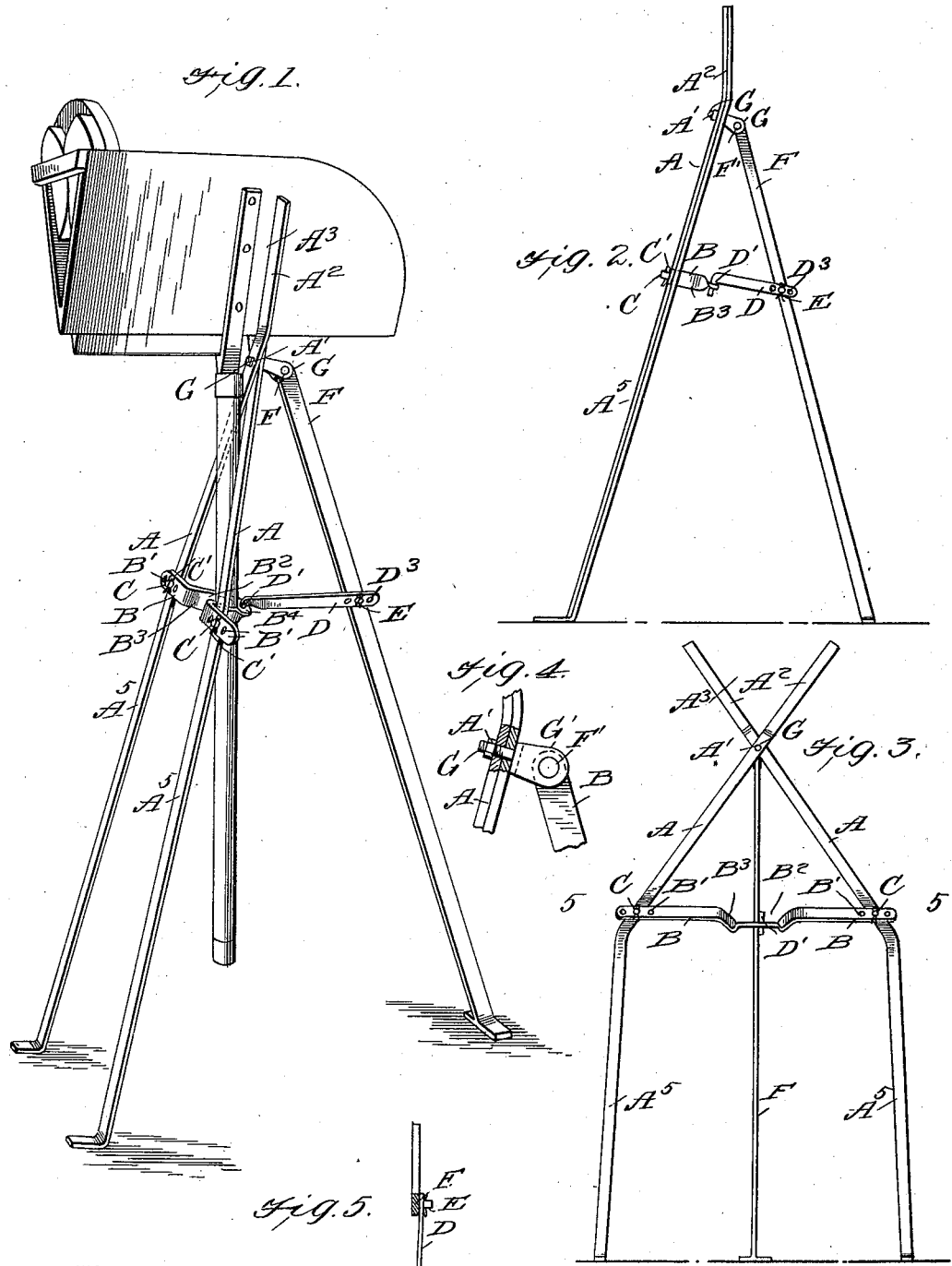
WITNESSES:
INVENTOR
SAMUEL H. MOORE
BY
ATTORNEYS

UNITED STATES PATENT OFFICE.

SAMUEL H. MOORE, OF PHOENIX, ARIZONA TERRITORY.

HOD-STAND.

1,000,284. Specification of Letters Patent. Patented Aug. 8, 1911.

Application filed April 1, 1911. Serial No. 618,331.

*To all whom it may concern:*

Be it known that I, SAMUEL H. MOORE, a citizen of the United States, and a resident of Phoenix, in the county of Maricopa and Territory of Arizona, have invented certain new and useful Improvements in Hod-Stands, of which the following is a specification.

This invention is an improvement in hod stands for use in holding hods for carrying brick or mortar and the invention has for an object to provide a novel construction of folding hod stand which can be adjusted to suit any size of mortar or brick hod and hold such hod when applied to the stand at any desired angle; and the invention consists in certain novel constructions and combinations of parts as will be hereinafter described and claimed.

In the drawing Figure 1 is a perspective view of the stand as in use, the hod being in position. Fig. 2 is a side view. Fig. 3 is a front view of the stand. Fig. 4 is a detail view illustrating the connection between the back bar and the main bars. Fig. 5 is a cross section drawn above and looking down upon the cross bar.

By my invention, I provide a hod stand having a forked top to receive the body of the hod and also provided with a cross brace below the fork and having a lateral recess or depression for receiving the hod handle, as best shown in Fig. 1.

In carrying out the invention, I employ main bars A which are pivoted together at A' and extend at $A^2$ above the pivot A' to form the fork $A^3$ for the reception of the hod body. The lower portions $A^5$ of the bars A extend approximately vertically and adjacent to the upper ends of the vertical portions $A^5$, I connect the cross bar B with the opposite bars A, the connection being adjustable by providing the bar B with series of openings B' to receive the bolts C, by which the cross bar is secured to the main bars. This cross bar has at its middle a lateral depression or recess $B^2$ formed preferably by curving the cross bar as best shown in Fig. 5, and this curved portion $B^3$ of the cross bar is perforated at $B^4$ for engagement by the point D' of the hook D which hook D is provided with a series of openings $D^3$ for the reception of the bolt E by which the said hook is adjustably secured to the bar F, which back bar F is pivotally connected at its upper end in connection with the main bars A, this connection being preferably effected by means of the bolt G, which forms the pivot at A' for the main bars and has a head G' to which the upper end of the back bar F is pivoted at F' as shown in Fig. 4.

In the use of the foregoing construction, it will be noticed the stand is adjustable so it can be made to suit any size of mortar or brick hod and can be set to hold the same at any suitable angle and the stand can be folded in order to be conveniently carried from one job to another. The cross bar being adjustably connected with the main bars, may be set to adjust said main bars to different angles in order that the fork may be spread or contracted to fit any size of hod, while the hook from the rear leg or bar may be adjusted to secure the hod handle at the desired angle.

The bolts C are preferably stud bolts projecting forwardly from the main bars and slotted near their outer ends to receive the cotter pins C', thus facilitating the releasing of the cross bar from one or both of the main bars, as may be desired.

In practice the stand may be made of wrought iron of suitable size and dimensions to give the necessary strength for supporting the hod and the device will be found useful for the purpose for which it is designed.

I claim:

1. The hod stand herein described, comprising the main bars pivoted together and extended above their pivot to form a fork adapted to receive a hod body, a cross bar connecting said main bars below the pivot thereof and capable of adjustment to secure the main bars at different distances apart, said cross bar having a lateral recess or depression midway between its ends, a back bar pivotally connected at its upper end with the main bars and a hook connected to the back bar and engaging with the cross bar, all substantially as and for the purposes set forth.

2. A hod stand having main bars formed with a forked top adapted to receive a hod body, a cross brace between said bar below the forked top and having a central recess or depression adapted to receive a hod handle, a back bar pivoted at its upper end and a connection between the back bar and cross brace, substantially as set forth.

SAMUEL H. MOORE.

Witnesses:
E. B. O'NEILL,
R. C. McKEAN.

Copies of this patent may be obtained for five cents each, by addressing the "Commissioner of Patents, Washington, D. C."